United States Patent
Birkbeck et al.

(10) Patent No.: US 11,748,854 B2
(45) Date of Patent: *Sep. 5, 2023

(54) NOISE REDUCTION METHOD FOR HIGH DYNAMIC RANGE VIDEOS

(71) Applicant: Google LLC, Mountain View, CA (US)

(72) Inventors: Neil Birkbeck, Santa Cruz, CA (US); Balineedu Adsumilli, Sunnyvale, CA (US); Mohammad Izadi, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/722,720

(22) Filed: Apr. 18, 2022

(65) Prior Publication Data
US 2022/0237749 A1 Jul. 28, 2022

Related U.S. Application Data

(63) Continuation of application No. 16/613,945, filed as application No. PCT/US2017/064621 on Dec. 5, 2017, now Pat. No. 11,308,585.

(51) Int. Cl.
*G06T 5/00* (2006.01)

(52) U.S. Cl.
CPC .... *G06T 5/002* (2013.01); *G06T 2207/10016* (2013.01); *G06T 2207/10024* (2013.01);
(Continued)

(58) Field of Classification Search
CPC .......... G06T 5/002; G06T 2207/10016; G06T 2207/10024; G06T 2207/20081; G06T 2207/20084
See application file for complete search history.

(56) References Cited

U.S. PATENT DOCUMENTS 5,500,685 A * 3/1996 Kokaram ............... H04N 5/145
375/240.06
9,159,121 B2 10/2015 Kwan et al.
(Continued)

OTHER PUBLICATIONS

M. Ghazal, A. Amer and A. Ghrayeb, "A Real-Time Technique for Spatio-Temporal Video Noise Estimation," in IEEE Transactions on Circuits and Systems for Video Technology, vol. 17, No. 12, pp. 1690-1699, Dec. 2007, doi: 10.1109/TCSVT.2007.903805. (Year: 2007).*

(Continued)

*Primary Examiner* — John R Schnurr
(74) *Attorney, Agent, or Firm* — Young Basile Hanlon & MacFarlane, P.C.

(57) ABSTRACT

Denoising video content includes identifying a three-dimensional flat frame block of multiple frames of the video content, wherein the three-dimensional flat frame block comprises flat frame blocks, each flat frame block is located within a respective frame of the multiple frames, and the flat frame blocks have a spatial and temporal intensity variance that is less than a threshold. Denoising video content also includes determining an average intensity value of the three-dimensional flat frame block, determining a noise model that represents noise characteristics of the three-dimensional flat frame block, generating a denoising function using the average intensity value and the noise model, and denoising the multiple frames using the denoising function.

20 Claims, 4 Drawing Sheets

(52) U.S. Cl.
CPC ............... *G06T 2207/20081* (2013.01); *G06T 2207/20084* (2013.01)

(56) References Cited

U.S. PATENT DOCUMENTS

| | | |
|---|---|---|
| 9,326,008 B2 | 4/2016 | Kokaram et al. |
| 2007/0009175 A1* | 1/2007 | Lim ........................ G06T 5/002 382/275 |
| 2015/0235350 A1* | 8/2015 | Kwan ..................... G06T 5/002 382/254 |

OTHER PUBLICATIONS

Anil Kokaram et al., "Measuring noise correlation for improved video denoising", 19th IEEE International Conference on Image Processing (ICIP), IEEE, Sep. 30, 2012, pp. 1201-1204.
International Search Report and Written Opinion in PCT/US2017/064621, dated Aug. 10, 2018, 15 pgs.

* cited by examiner

NOISE REDUCTION METHOD FOR HIGH DYNAMIC RANGE VIDEOS

This application is a continuation of U.S. patent application Ser. No. 16/613,945, filed Nov. 15, 2019, the contents of which are incorporated herein in their entirety by reference.

BACKGROUND

Digital media content, such as video content or video streams, may represent video using a sequence of frames or still images. Video streams can be used for various applications including, for example, video conferencing, high-definition video entertainment, video advertisements, or sharing of user-generated videos. A video stream can contain a large amount of data and consume a significant amount of computing or communications resources of a computing device for processing, transmission, or storage of the data. Various approaches have been proposed to reduce the amount of data in video streams, including lossy and lossless compression techniques.

SUMMARY

This disclosure relates generally to noise reduction for, e.g., high dynamic range, video content.

An aspect of the disclosed embodiments is a method for denoising video content. The method can include identifying a three-dimensional flat frame block of multiple frames of the video content, wherein the three-dimensional flat frame block comprises flat frame blocks, each flat frame block is located within a respective frame of the multiple frames, and the flat frame blocks have a spatial and a temporal intensity variance that is less than a threshold, determining an average intensity value of the three-dimensional flat frame block, determining a noise model that represents noise characteristics of the three-dimensional flat frame block, generating a denoising function using the average intensity value and the noise model, and denoising the multiple frames using the denoising function.

An aspect of the disclosed embodiments is an apparatus for denoising video content that includes a processor. The processor can be configured to identify a three-dimensional flat frame block of multiple frames of the video content, wherein the three-dimensional flat frame block comprises flat frame blocks, each flat frame block is located within a respective frame of the multiple frames, and the flat frame blocks have a spatial and a temporal intensity variance that is less than a threshold, determine an average intensity value of the three-dimensional flat frame block, determine a noise model that represents noise characteristics of the three-dimensional flat frame block, generate a denoising function using the average intensity value and the noise model, and denoise the multiple frames using the denoising function.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Media content, such as video content, which is streamed or shared on social media platforms, is often corrupted by video noise. The noise may not be perceptible by a consumer of the media content, however characteristics of the noise may negatively affect media content processing, such as video compression and/or video coding. For example, a video may have to be compressed or encoded at a relatively high bitrate to preserve the quality of the original noisy video (e.g., to accommodate the noise and preserve the perceptible quality of the original video). Encoding the media content at relatively high bitrates may result in large files, which in turn may increase storage and network costs associated with storing encoded media content, communicating encoded media content over a network, streaming encoded media content, or a combination thereof.

It may be advantageous to compress or encode the media content at a relatively low bitrate (e.g., resulting in a small data file for storage and/or network streaming) to limit storage costs, communication costs, network costs, or other costs associated with the encoded media content. However, when media content, such as video content, is compressed at a relatively low bitrate, the noise in the original video may interact with the video encoder causing perceptually disturbing artifacts in the encoded video. Denoising video content (e.g., removing noise) prior to the video content being encoded may result in a better perceptual quality of the video content when the video content is encoded at a relatively low bitrate.

In some embodiments, the media content may include a high dynamic range (HDR) video. HDR videos typically includes videos having a greater dynamic range than a dynamic range of a standard dynamic range (SDR) video. For example, SDR video typically has a bit depth of 8-bits per sample and a dynamic range of 6 stops. A stop includes a measurement of exposure characteristics of individual images associated with the video content. An HDR video may have a bit depth of 10-bits per sample and a dynamic range 17.6 stops. As a result of the bit depth and stop value associated with HDR video, HDR video may provide a greater brightness range and a wider color range than SDR video.

As a result of HDR videos having a greater brightness range and a wider color range, both perceptibility (e.g., visibility) and strength of noise characteristics associated with HDR videos may vary in a non-linear fashion across various visible (e.g., the brightness spectrum) regions of the HDR videos. For example, noise characteristics may be more prominent or visible in relatively dark areas of an HDR video and less prominent or visible in relatively bright areas of the HDR video. Denoising an HDR video using standard or conventional denoising techniques, which typically identify and remove noise characteristics having consistent perceptibility and strength, may result in over-denoising relatively dark areas of the HDR video and under-denoising relatively bright areas of the HDR video. Systems and methods that denoise model noise characteristics of HDR videos and that denoise HDR videos while preserving perceptible quality of HDR videos across the brightness spectrum are desirable.

In some embodiments, a method according to the principles of the present disclosure may include identifying flat or homogenous frame blocks associated with an HDR video. Flat frame blocks include frame blocks that include homogenous images or have a homogenous spatial texture within the image of the frame block. An average intensity value for each of the flat frame blocks is determined. Noise models that represent characteristics of the flat frame blocks are determined. A denoising function using the average intensity value and a noise model for each respective flat frame block is generated. Frame blocks associated with the HDR video, including flat frame blocks and non-flat frame blocks, are denoised using the denoising function.

In some embodiments, the denoised HDR video may be encoded, at a server computer according to video coding scheme, at a suitable bit rate for storage of the HDR video in a storage medium and/or communication of the HDR video over a network. The HDR video may then be decoded, according to the video coding scheme, by a client computing device, such as a mobile phone, a tablet computer, a laptop computer, a notebook computer, a desktop computer, or other suitable computing device, capable of streaming, displaying, and/or playing back the HDR video.

In some embodiments, a video coding scheme may include breaking images associated with the HDR video into blocks and generating a digital video output bitstream (i.e., an encoded bitstream) using one or more techniques to limit the information included in the output bitstream. A received bitstream (e.g., received by a client device) can be decoded to re-create the blocks and the source images from the limited information. Encoding an HDR video, or a portion thereof, such as a frame or a block, can include using temporal or spatial similarities in the HDR video to improve coding efficiency. For example, a current block of an HDR video may be encoded based on identifying a difference (residual) between the previously coded pixel values, or between a combination of previously coded pixel values, and those in the current block.

Figure 1:
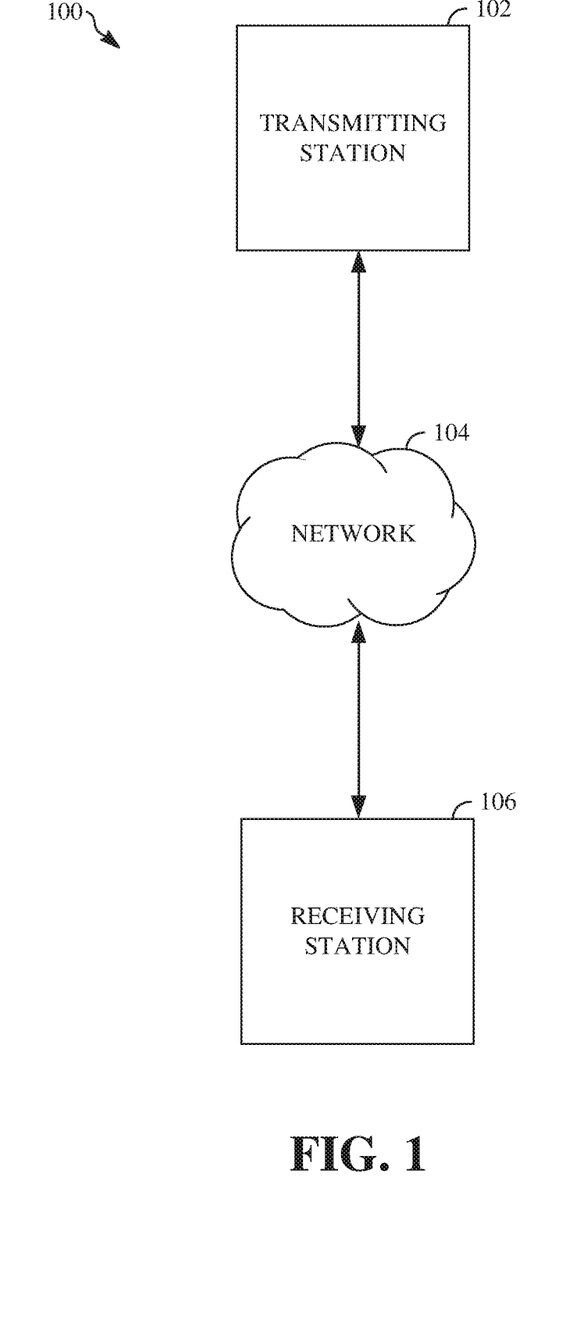
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of a video stream, such as a video stream of an HDR video or other suitable video content. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
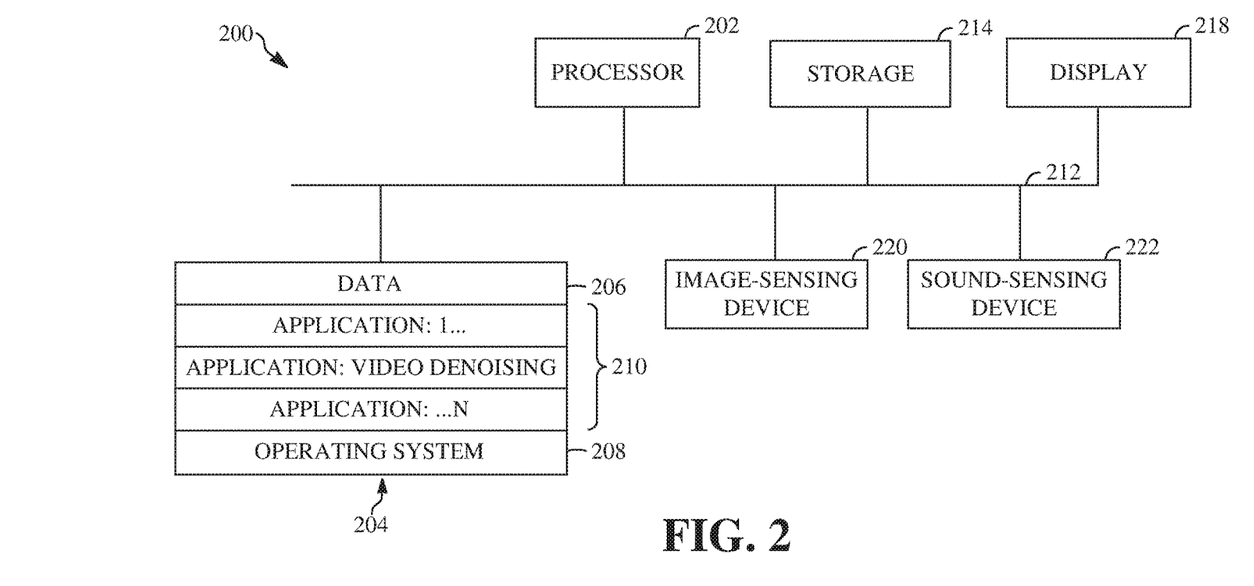
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for subsequent transmission to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

FIG. 2 is a block diagram of an example of a computing device 200 that can implement a transmitting station or a receiving station. For example, the computing device 200 can implement one of or both the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, a server computer, or other suitable computing device.

A CPU 202 of the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown, e.g., the CPU 202, advantages in speed and efficiency can be achieved using more than one processor.

A memory 204 of the computing device 200 can be a read-only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application and/or a video denoising application that performs the methods described here. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. In some embodiments, the display 218 can include a high dynamic range (HDR) display capable of displaying HDR video content. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display, or other suitable display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
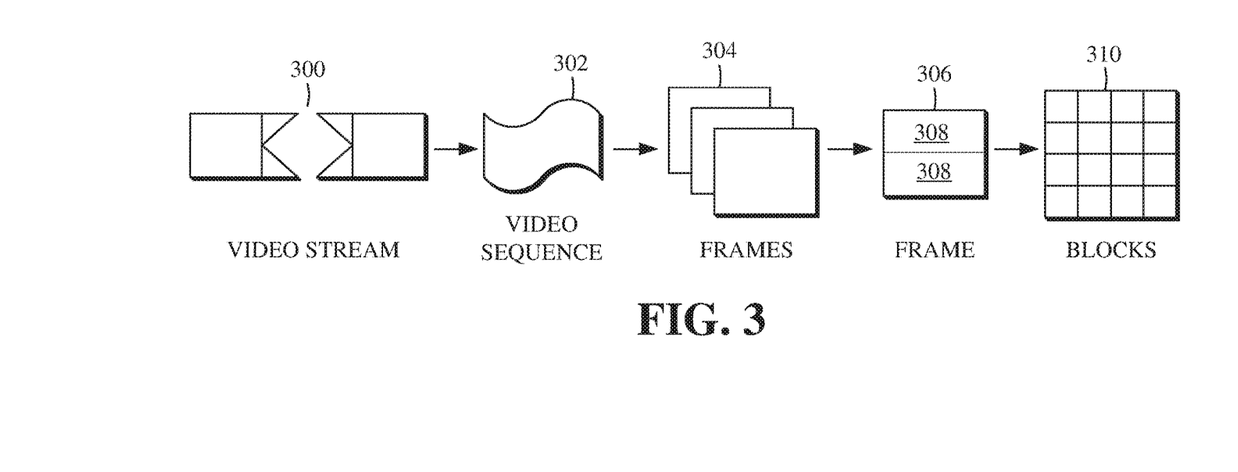
FIG. 3 is a diagram of a typical video stream to be encoded and subsequently decoded.

FIG. 3 is a diagram of an example of a video stream 300 to be encoded and subsequently decoded. The video stream 300 may include media content, as described above, such as an HDR video stream. The video stream 300 includes a video sequence 302. At the next level, the video sequence 302 includes several adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frame data that permit parallel processing, for example. The segments 308 can also be subsets of frame data comprising separate colors. For example, a frame 306 of color video data can include a luminance plane and two chrominance planes. The segments 308 may be sampled at different resolutions.

Whether or not the frame 306 is divided into segments 308, the frame 306 may be further subdivided into frame blocks 310, which can contain data corresponding to, for example, 16×16 pixels in the frame 306. The frame blocks 310 can also be arranged to include data from one or more segments 308 of pixel data. The frame blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein. In some embodiments, the frame blocks 310 can be blocks having n×n pixels that overlap adjacent frame blocks. For example, a first frame block 310 be a n×n block that includes half of the n×n pixels from a first adjacent frame block 310 and half of the n×n pixels from a second adjacent frame block 310, such that the first frame block 310 overlaps the first adjacent frame block 310 and the second adjacent frame block 310.

Figure 4:
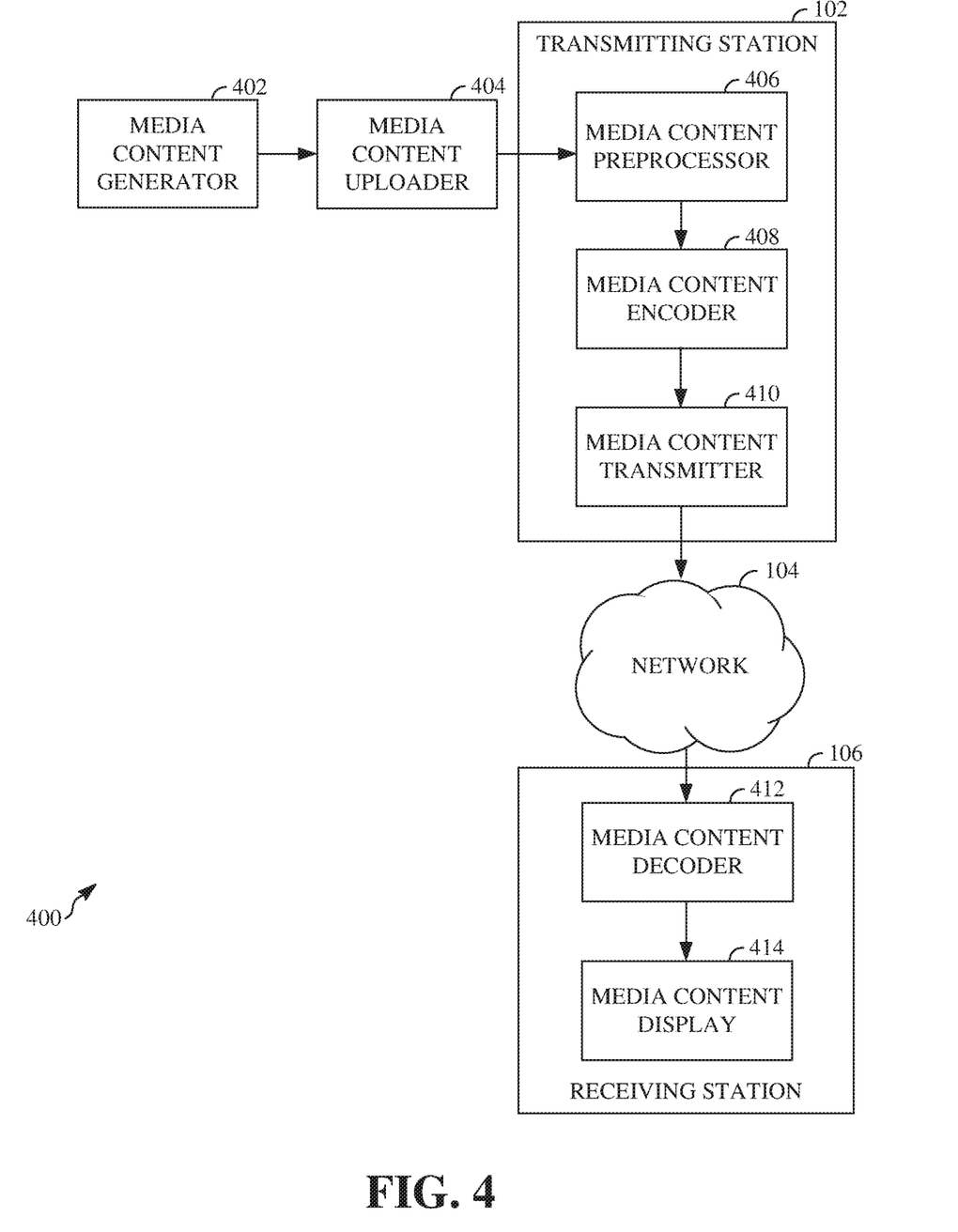
FIG. 4 is a block diagram of an example of a media content streaming system.

FIG. 4 is a block diagram of an example of a media content streaming system 400. The media content streaming system 400 may be configured to stream media content, such as HDR videos or other suitable video content, to a display. The media content streaming system 400 includes a media content generator 402, a media content uploader 404, a transmitting station, such as the transmitting station 102 described above, a network, such as the network 104 described above, and a receiving station, such as the receiving station 106 described above.

The transmitting station 102 includes a media content preprocessor 406, a media content encoder 408, and a media content transmitter 410. The receiving station 106 includes a media content decoder 412 and a media content display 414. The media content display 414 includes similar features to those of the display 218 of the computing device 200 described above. In some embodiments, the media content streaming system 400 may include fewer, additional, and/or different components than those described herein.

The media content generator 402 generates media content, such as video content, audio content, photographic images, or other suitable media content. The media content generator 402 may include one or more video capture devices, such as video camera. A video capture device may be a standalone video capture device or may be associated with a computing device, such as the computing device 200 described above. In some embodiments, the media content generator 402 may be or include one or more software applications configured to generate media content, such as HDR video content or other suitable media content.

The media content uploader 404 is configured to upload media content generated by the media content generator 402 to the transmitting station 102. The media content uploader 404 may include any suitable media content uploader, such as a software application running on a computing device, such as the computing device 200, described above. The media content preprocessor 406 is configured to receive the uploaded media content and to perform preprocessing on the media content. For example, the media content preprocessor 406 may denoise the HDR video as will be described in detail below.

The media content encoder 408 is configured to encode the media content according to a media content coding scheme. The media content encoder 408 may include a video encoder configured to encode the media content at a bitrate suitable for storing the encoded media content in a storage medium associated with the media content streaming system 400 and/or to transmit or communicate the encoded media content over a network to, for example, the receiving station 106. The media content encoder 408 may be configured to encode media content as described above.

The media content transmitter 410 is configured to transmit or communicate the encoded media content over the network 104. For example, the media content transmitter 410 may transmit the encoded media content to the receiving station 106 via the network 104. The media content transmitter 410 may transmit or communicate the encoded media content using any suitable transmission or communications protocol.

The receiving station 106 is configured to receive the encoded media content, as described above. The media content decoder 412 is configured to decode the encoded media content according to the media content coding scheme used to encode the encoded media content, as described above. The media content display 414 may include any suitable display, such as the display 218 of the computing device 200, as described above. The media content display 414 is configured to display the decoded media content, for example, for viewing by a consumer of the media content using a media content viewing application (e.g., a media content viewing application installed on the computing device 200, a web-based media content viewing application, or other suitable media content viewing application).

Figure 5:
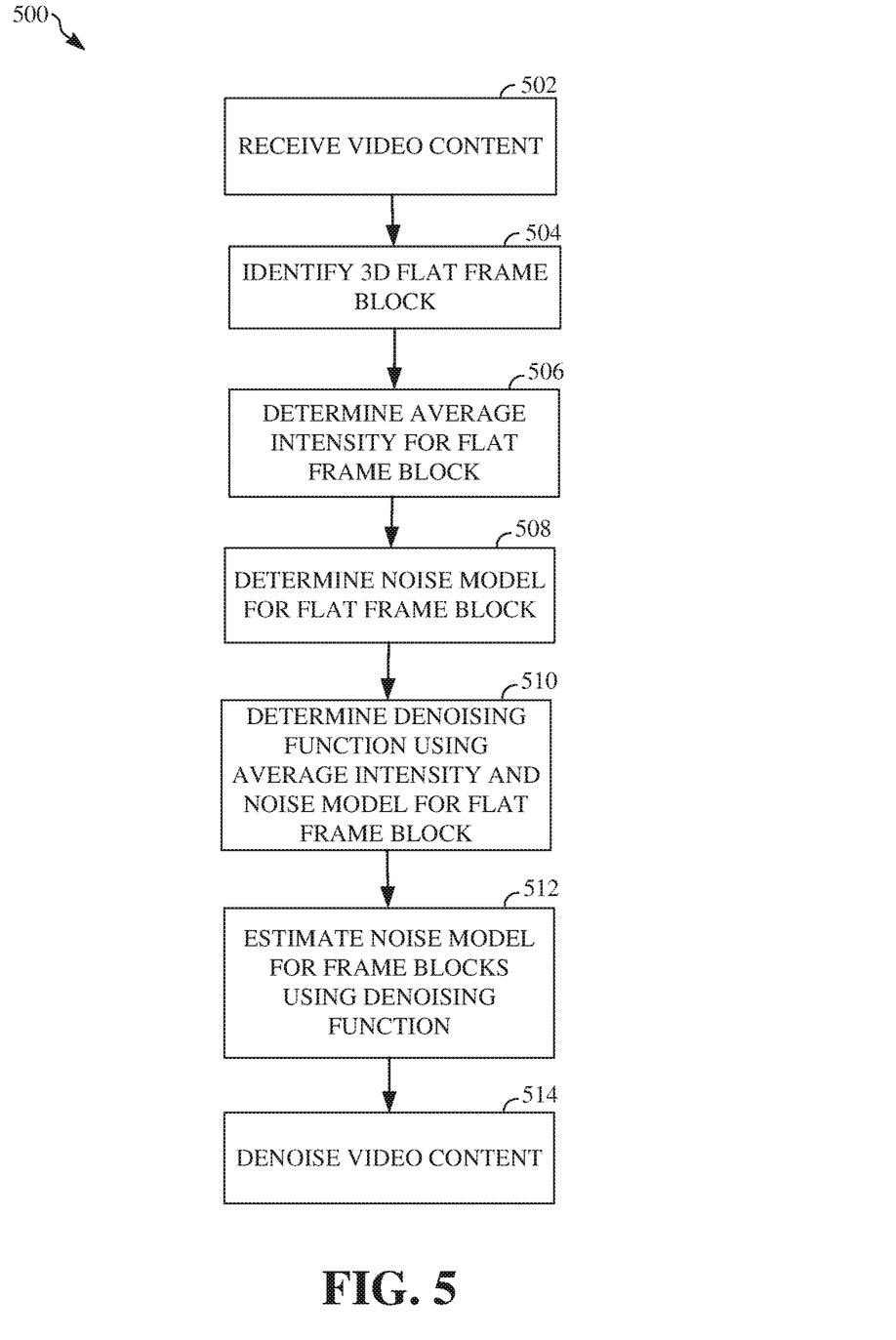
FIG. 5 is a flowchart diagram of a process for reducing noise in high dynamic range videos according to an implementation of this disclosure.

FIG. 5 is a flowchart diagram of a process 500 denoising media content according to an implementation of this disclosure. The process 500 receives media content and identifies flat frame blocks associated with the media content. The process 500 determines an average intensity value for each of the identified flat frame blocks. The process 500 determines a power spectral density (PSD) for each of the identified flat frame blocks. The process 500 determines a denoising function using the average intensity value and the noise PSD associated with respective flat frame blocks. The process 500 denoises the media content using the denoising function.

The process 500 can be implemented, for example, as a software program that may be executed by computing devices such as transmitting station 102. For example, the software program can include machine-readable instructions that may be stored in a memory such as the memory 204 or the secondary storage 214 and that, when executed by a processor such as CPU 202, causes the computing device to perform the process 500. The process 500 can be implemented using specialized hardware or firmware. As explained above, some computing devices may have multiple memories or processors, and the operations described in the process 500 can be distributed using multiple processors, memories, or both.

At 502, the process 500 receives media content, as described above. The media content may include video content, audio content, photographic images, or other suitable media content. For example, the media content may include an HDR video, as described above. The HDR video may include noise characteristics that affects a perceptible quality of the HDR video. As described above, the noise characteristics may vary in strength and perceptibility in a non-linear fashion along the brightness spectrum of the HDR video. For example, noise characteristics may be more prominent or visible in relatively dark areas of an HDR video and less prominent or visible in relatively bright areas of the HDR video.

At 504, the process 500 identifies flat frame blocks associated with the HDR video. The process 500 may identify flat frame blocks as described in U.S. Patent Publication No. 2018/0352118 A1, which is incorporated by reference herein in its entirety, or by other suitable methods of identifying flat frame blocks. A flat frame block may include a 3-dimensional block that comprises at least a portion of the block in a current frame (e.g., of a plurality of frames of the HDR video), at least a portion of the block in a previous frame, and at least a portion of the block of the subsequent or next frame. A 3-dimensional block may be represented by an n by n by k matrix. For example, a 3-dimensional block may include k flat frame blocks of n×n size in k consecutive frames (e.g., frames sequentially arranged within a video sequence). In some embodiments, flat frame blocks may be identified by identifying blocks having a spatial and temporal intensity variance that is less than a predetermined threshold. As described above, the HDR video may be divided into frames. The frames are then subdivided into half overlapping, frame blocks of equal size, such as size n×n pixels.

At 506, the process 500 determines an average intensity value for each identified flat frame block (e.g., for multiple three-dimensional flat frame blocks). The process 500 may determine an average intensity value (e.g., brightness) for a flat frame block based on a video format associated with the HDR video. For example, the video format for the HDR video may be a red, green, and blue (RGB) video format, a YUV format, or other suitable video format.

The process 500 identifies an intensity value for each pixel of the flat frame block. The process 500 determines the average intensity value for the flat frame block by determining an average of the intensity values for each respective pixel in the flat frame block. When the HDR video is represented in an RGB video format, the process 500 identifies a red value associated with the R channel for each respective pixel, identifies a green value associated with a G channel for each respective pixel, and identifies a blue value associated with a B channel for each respective pixel. The process 500 determines the intensity value for each respective pixel by determining an average of the red value, the green value, and the blue value for each respective pixel. When the HDR video is represented as a YUV video format, the intensity value for each pixel of the flat frame block is equal to a value of the Y channel. The process 500 determines the average intensity value for the flat frame block by calculating an average of the identified intensity values for each respective pixel of the flat frame block. In some embodiments, the process 500 determines an average intensity value for each identified flat frame block associated with the HDR video.

At 508, the process 500 determines a noise PSD for each identified flat frame block. A noise PSD mathematically represents noise characteristics of a frame block associated with the HDR video by representing energy associated with noise in the HDR video at different frequencies. For example, a noise PSD (e.g., a noise model) for a flat frame block may be determined by subtracting each respective pixel value of the flat frame block at each channel from the average intensity value of the flat frame block at each channel. This may be referred to as detrending the flat frame block. The process 500 may then window the detrended flat frame block using a half-cosine function to reduce and/or eliminate ringing when using a fast Fourier transform (FFT) function. The process 500 may then use the windowed flat frame block in an FFT function. The process 500 may determine the noise PSD for the flat frame block by squaring the result of the FFT. The resulting noise PSD may be a three-dimensional (3-dimensional or 3D) noise PSD having a plurality of elements that may be represented by an n by n by k matrix. The process 500 determines a noise PSD for each of the identified flat frame blocks, as described.

At 510, the process 500 determines a denoising function using the average intensity value and the noise PSD for each respective flat frame block. The denoising function may be determined by interpolating and/or extrapolating the relationship between the average intensity value for a flat frame block and the noise PSD for the flat frame block. For example, the denoising function maps the average intensity value to the noise PSD for each respective flat frame block. The denoising function may include a nonlinear function using least square based polynomial approximation to map the average intensity value of each respective flat frame block to the noise PSD of each respective flat frame block. The resulting denoising function provides an estimated noise PSD for each respective possible intensity value. That is, the denoising function provides a correlation between noise PSDs and intensity value. A noise PSD can be estimated for non-flat (e.g., non-homogenous or heterogeneous) frame blocks by identifying the noise PSD corresponding to an identified intensity value for the non-flat frame block.

In some embodiments, the process 500 determines the denoising function by independently fitting a polynomial function to each element of the noise PSD for each respective flat frame block. This may reduce complexity of the polynomial function. The polynomial function for a respective flat frame block is a map of the average intensity value of the flat frame block to a real number. Together, the polynomial functions for all flat frame blocks of the HDR video represent a map of average intensity values to the determined noise PSDs of the flat frame block of the HDR video.

In some embodiments, the process 500 determines the denoising function using a neural network. For example, the process 500 may train a neural network to estimate noise PSDs for non-flat frame blocks. The neural network may receive the average intensity values and noise PSDs for each respective flat frame block, as described. The neural network may map average intensity values to noise PSDs (e.g., determined for each flat frame block).

In some embodiments, the process 500 determines the denoising function by finding a minimum intensity value for the HDR video and a maximum intensity value for the HDR video. The process 500 may then divide a range from the function log(minimum intensity value) to the function log (maximum intensity value) into m bins, where each respective bin of the m bins corresponds to a range of intensity values. For example, a first bin of the m bins may correspond to a first range of intensity values ranging from a first intensity value to a second intensity value and a second bin of the m bins may correspond to a second range of intensity values ranging from a third intensity value to a fourth intensity value.

The process 500 may then identify, for each respective bin of the m bins, flat frame blocks having an average intensity value within the range of intensity values corresponding to each respective bin of the m bins. The process 500 may then determine an estimated noise PSD for each respective bin by determining an average noise PSD for each respective bin of the m bins by averaging the noise PSDs associated with each flat frame block having an average intensity value within a range of intensity values associated with each respective bin and by adding three standard deviations of the noise PSDs of each respective bin to the average noise PSD (e.g., element wise).

At 512, the process 500 as described identifies an average intensity for a non-flat frame block. In some embodiments, when the denoising function is determined using a polynomial function, as described above, the process 500 may identify an average intensity value associated with a non-flat frame block, as described above with respect to identifying average intensity values associated with flat frame blocks. The process 500 may input the average intensity value associated with the non-flat frame block into the denoising function. The result of the denoising function is an estimated noise PSD for the non-flat frame block (e.g., based on the map of average intensity values to noise PSDs). The process 500 continues to identify PSDs for respective blocks of the media content (e.g., all flat frame blocks and non-flat frame blocks associated with the HDR video).

In some embodiments, when the denoising function is determined using a neural network, the process 500 may identify an average intensity value associated with a non-flat frame block, as described above with respect to identifying average intensity values associated with flat frame blocks. The process 500 may input the average intensity value associated with the non-flat frame block into the denoising function determined by the neural network. The result of the denoising function is an estimated noise PSD for the non-flat frame block (e.g., based on the map of average intensity values to noise PSDs). The process 500 continues to identify PSDs for a respective block of the media content until, e.g., all flat frame blocks and non-flat frame blocks associated with the HDR video have been considered.

In some embodiments, when the denoising function is determined by finding a minimum intensity value and a maximum intensity value for the HDR video, as described above, the process 500 compares the average intensity value for the non-flat frame block with the range of intensity values associated with each respective bin. The process 500 determines which range of intensity values the average intensity value for the non-flat frame block is within. The process 500 estimates a noise power spectral density (noise PSD) for the non-flat frame block by identifying the noise PSD associated with the respective bin having the range of intensity values that the average intensity value of the non-flat frame block is within. The process 500 continues to identify PSDs for all flat frame blocks and non-flat frame blocks associated with the HDR video.

At 514, the process 500 denoises the media content (e.g., the video content) using the noise PSDs for each respective flat frame block and each respective non-flat frame block. Each frame block in the HDR video may be denoised using a Wiener filter or other suitable denoising technique. The process 500 determines a block PSD for each respective frame block of the HDR video. The block PSD for a respective frame block represents both noise characteristics and non-noise characteristics of the respective frame block. The process 500 provides the average intensity value, the block PSD, and the noise PSD (e.g., determined for flat frame blocks and estimated for non-flat frame blocks) for the respective frame block of the HDR video to the Wiener filter. The Wiener filter function may be represented by:

$$W=((PSD_{block})-(PSD_{noise}))/(PSD_{block})$$

In the above, W is the result of the Wiener filter function and represents a portion of a frame block that is not noisy, $PSD_{block}$ represents the PSD for the frame block (e.g., including both noise and non-noise characteristics of the frame block), and $PSD_{noise}$ represents the noise PSD for a frame block (e.g., representing the noise characteristics of the frame block). The process 500 determines W using the function above. The process 500 multiplies W by the FFT of the windowed frame block associate with the respective frame block, as described. In some embodiments, the process 500 may apply an inverse FFT to the product of W and the FFT of the windowed frame block. The process 500 may then add the product of a half-cosine window of the respective frame block and the average pixel value of the frame block to the result of the inverse FFT of the product of W and the FFT of the windowed frame block. The process 500 continues to denoise each frame block of the HDR video.

In some embodiments, the process 500 may window a denoised frame block, which results in a squared cosine window of the denoised frame block. The squared cosine window of the denoised frame block sums to unity when it is applied with half overlapping frame blocks. The process 500 may use the squared cosine window of the denoised frame blocks to generate a denoised version of the HDR video that has intensity values corresponding to the intensity values of the original HDR video.

In some embodiments, a method for denoising video content may include identifying a first frame block of a plurality of frame blocks associated with a first frame of the video content. The method may also include determining an average intensity value for the first frame block. The method may also include determining a first noise model that represents characteristics of the first frame block. The method may also include generating a denoising function using the average intensity value and the first noise model for the first frame block. The method may further include denoising the plurality of frame blocks using the denoising function.

In some embodiments of the method, the video content includes high dynamic range video content. In some embodiments of the method, the first noise model includes a power spectral density. In some embodiments of the method, denoising the plurality of frame blocks includes estimating a respective noise model for each frame block of the plurality of frame blocks using the denoising function. In some embodiments of the method, the denoising function maps the average intensity value of the first frame block to the first noise model of the first frame block. In some embodiments, the video content is represented in an RGB video format. In some embodiments of the method, the video content is represented in a YUV video format. In some embodiments of the method, determining the denoising function includes fitting a polynomial function to elements of the first noise model. In some embodiments of the method, determining the denoising function includes training a neural network to map the average intensity value for the first frame block to the first noise model. In some embodiments of the method, determining the denoising function includes identifying bins corresponding to a range of intensity values and mapping the first noise model to a respective bin that corresponds to a range of intensity values that the average intensity value is within.

In some embodiments, an apparatus for denoising video content may include a memory and a processor. The memory includes instructions executable by the processor to identify a first frame block of a plurality of frame blocks associated with a first frame of the video content, determine an average intensity value for the first frame block, determine a first noise model that represents characteristics of the first frame block, generate a denoising function using the average intensity value and the first noise model for the first frame block, denoise the plurality of frame blocks using the denoising function, and estimate a respective noise model for each frame block of the plurality of frame blocks using the denoising function.

In some embodiments of the apparatus, the video content includes high dynamic range video content. In some embodiments of the apparatus, the first noise model includes a power spectral density. In some embodiments of the apparatus, denoising the plurality of frame blocks includes estimating a respective noise model for each frame block of the plurality of frame blocks using the denoising function. In some embodiments of the apparatus, the denoising function maps the average intensity value of the first frame block to the first noise model of the first frame block. In some embodiments, the video content is represented in an RGB video format. In some embodiments of the apparatus, the video content is represented in a YUV video format.

In some embodiments of the apparatus, the memory includes instructions executable by the processor to determine the denoising function by fitting a polynomial function to elements of the first noise model. In some embodiments of the apparatus, the memory includes instructions executable by the processor to determine the denoising function by training a neural network to map the average intensity value for the first frame block to the first noise model. In some embodiments of the apparatus, the memory includes instructions executable by the processor to determine the denoising function by identifying bins corresponding to a range of intensity values and mapping the first noise model to a respective bin that corresponds to a range of intensity values that the average intensity value is within.

In some embodiments, an apparatus for denoising video content may include a memory and a processor. The memory includes instructions executable by the processor to identify a first frame block of a plurality of frame blocks associated with a first frame of the video content, determine an average intensity value for the first frame block, determine a first noise model that represents characteristics of the first frame block, generate a denoising function using the average intensity value and the first noise model for the first frame block, estimate a respective noise model for each frame block of the plurality of frame blocks using the denoising function, and denoise the plurality of frame blocks using the respective estimated noise models for each frame block of the plurality of frame blocks.

In some embodiments of the apparatus, the video content includes high dynamic range video content. In some embodiments of the apparatus, the first noise model includes a power spectral density. In some embodiments of the apparatus, denoising the plurality of frame blocks includes estimating a respective noise model for each frame block of the plurality of frame blocks using the denoising function. In some embodiments of the apparatus, the denoising function maps the average intensity value of the first frame block to the first noise model of the first frame block. In some embodiments of the apparatus, the video content is represented in an RGB video format. In some embodiments, the video content is represented in a YUV video format.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for denoising video content, comprising:
    identifying a three-dimensional flat frame block of multiple frames of the video content, wherein the three-dimensional flat frame block comprises flat frame blocks, each flat frame block is located within a respective frame of the multiple frames, and the flat frame blocks have a spatial and a temporal intensity variance that is less than a threshold;
    determining an average intensity value of the three-dimensional flat frame block;
    determining a noise model that represents noise characteristics of the three-dimensional flat frame block;
    generating a denoising function using the average intensity value and the noise model; and
    denoising the multiple frames using the denoising function.

2. The method of claim 1, wherein denoising the multiple frames comprises:
    estimating a noise model for a non-flat frame block using an average intensity value for the non-flat frame block as input to the denoising function; and
    removing noise from the non-flat frame block using the noise model for the non-flat frame block.

3. The method of claim 1, comprising:
    determining a minimum intensity value for the video content;
    determining a maximum intensity value for the video content;
    dividing intensity values between the minimum intensity value and the maximum intensity value into bins, wherein each respective bin of the bins corresponds to a range of intensity values and is associated with a respective noise model, wherein denoising the multiple frames using the denoising function comprises:
    for respective blocks of the video content:
        comparing an average intensity value for a respective block with the range of intensity values associated with each respective bin;
        identifying a noise model for the respective block that is associated with the respective bin having the range of intensity values that the average intensity value is within; and
        denoising the respective block using the noise model.

4. The method of claim 1, wherein:
    determining the average intensity value of the three-dimensional flat frame block and determining the noise model that represents noise characteristics of the three-dimensional flat frame block comprises, for each flat frame block of the three-dimensional flat frame block:
        determining an average intensity value for the flat frame block; and
        determining a noise model that represents noise characteristics of the flat frame block, and
    generating the denoising function comprises generating the denoising function using the average intensity value and the noise model for each flat frame block of the three-dimensional flat frame block.

5. The method of claim 1, wherein the denoising function comprises a nonlinear function using least square based polynomial approximation to map the average intensity value to the noise model.

6. The method of claim 1, wherein the video content has a greater dynamic range than a dynamic range of a standard dynamic range video.

7. The method of claim 1, wherein the video content comprises high dynamic range video content.

8. The method of claim 1, wherein the noise model mathematically represents the noise characteristics of the flat frame block by representing energy associated with noise at different frequencies.

9. The method of claim 1, wherein the noise model comprises a power spectral density.

10. The method of claim 1, comprising:
    dividing each frame of the multiple frames into half overlapping frame blocks of an equal size, wherein each flat frame block of the three-dimensional flat frame block comprises a frame block of the half overlapping frame blocks of a respective frame of the multiple frames.

11. An apparatus for denoising video content, comprising:
    a processor configured to:
    identify a three-dimensional flat frame block of multiple frames of the video content, wherein the three-dimensional flat frame block comprises flat frame blocks, each flat frame block is located within a respective frame of the multiple frames, and the flat frame blocks have a spatial and a temporal intensity variance that is less than a threshold;

determine an average intensity value of the three-dimensional flat frame block;
determine a noise model that represents noise characteristics of the three-dimensional flat frame block;
generate a denoising function using the average intensity value and the noise model; and
denoise the multiple frames using the denoising function.

12. The apparatus of claim 11, wherein:
the three-dimensional flat frame block comprises a first three-dimensional flat frame block of multiple three-dimensional flat frame blocks,
to determine the average intensity value of the three-dimensional flat frame block comprises to determine a respective average intensity value for each of the multiple three-dimensional flat frame blocks;
to determine the noise model that represents the noise characteristics of the three-dimensional flat frame block comprises to determine a respective noise model for each of the multiple three-dimensional flat frame blocks; and
to generate the denoising function using the average intensity value and the noise model comprises to generate the denoising function using the respective average intensity values and the respective noise models.

13. The apparatus of claim 11, wherein:
the noise model comprises a noise power spectral density (PSD),
to generate the denoising function comprises to independently fit a polynomial function to each element of the noise PSD, wherein the polynomial functions together represent a map of average intensity values to a noise PSD, and
to denoise the multiple frames comprises to, for each block of a plurality of blocks of the multiple frames:
determine a noise PSD for the block using an average intensity value of the block as input to the polynomial functions;
determine a PSD for the block; and
remove the noise PSD from the PSD for the block.

14. The apparatus of claim 11, wherein the video content comprises a video sequence and the multiple frames comprise at least three frames sequentially arranged within the video sequence.

15. The apparatus of claim 11, wherein:
the noise model comprises a noise power spectral density (PSD), and
to denoise the multiple frames comprises to, for each block of a plurality of blocks of the multiple frames:
determine a noise PSD for the block using an average intensity value of the block as input to the denoising function;
determine a PSD for the block; and
remove the noise PSD from the PSD for the block.

16. The apparatus of claim 11, wherein to denoise the multiple frames comprises to, for each block of a plurality of blocks of the multiple frames:
determine a noise PSD for the block using an average intensity value of the block as input to the denoising function;
determine a PSD for the block; and
remove the noise PSD from the PSD for the block using a Wiener filter.

17. The apparatus of claim 11, wherein to denoise the multiple frames comprises to:
estimate respective noise models for frame blocks of the multiple frames using a respective average intensity value for the frame blocks as input to the denoising function; and
remove noise from the respective frame blocks using the respective noise models.

18. The apparatus of claim 11, wherein the denoising function maps the average intensity value to the noise model.

19. The apparatus of claim 11, wherein:
the three-dimensional flat frame block comprises a first three-dimensional flat frame block of multiple three-dimensional flat frame blocks,
to determine the average intensity value of the three-dimensional flat frame block comprises to determine a respective average intensity value for each of the multiple three-dimensional flat frame blocks;
to determine the noise model that represents the noise characteristics of the three-dimensional flat frame block comprises to determine a respective noise model for each of the multiple three-dimensional flat frame blocks; and
to generate the denoising function using the average intensity value and the noise model comprises to train a neural network to map the respective average intensity values to the respective noise models.

20. The apparatus of claim 11, wherein the video content comprises high dynamic range video content represented in one of an RGB video format or a YUV video format.

* * * * *